United States Patent [19]

Nakamichi

[11] Patent Number: 4,502,577
[45] Date of Patent: Mar. 5, 1985

[54] CONTROL MECHANISM OF A POWER SHIFT TRANSMISSION

[75] Inventor: Noboru Nakamichi, Kadoma, Japan

[73] Assignee: Kabushiki Kaisha Daikin Seisakusho, Osaka, Japan

[21] Appl. No.: 405,703

[22] Filed: Aug. 5, 1982

[30] Foreign Application Priority Data

Dec. 28, 1979 [JP] Japan .................... 54-171984

[51] Int. Cl.³ ............................................. B60K 41/28
[52] U.S. Cl. ..................... 192/4 A; 192/13 R; 192/87.19; 192/109 F
[58] Field of Search ............ 192/12 C, 13 R, 4 C, 192/3.57, 87.19, 4 A, 109 F, 0.082, 51

[56] References Cited

U.S. PATENT DOCUMENTS

| | | | |
|---|---|---|---|
| 3,659,690 | 5/1972 | Kitano et al. | 192/4 C |
| 3,715,017 | 2/1973 | Jenney | 192/13 R |
| 3,752,281 | 8/1973 | Arnold | 192/87.19 |
| 3,757,915 | 9/1973 | Momose | 192/87.19 |
| 3,840,099 | 10/1974 | Higuchi et al. | 192/13 R |
| 3,990,549 | 11/1976 | Sisson et al. | 192/87.19 |

Primary Examiner—George H. Krizmanich
Attorney, Agent, or Firm—Armstrong, Nikaido, Marmelstein & Kubovcik

[57] ABSTRACT

A control mechanism of a power shift transmission is disclosed and arranged in oil passages between the hydraulic pressure source and a hydraulic clutch, comprising an inching valve disposed in an upstream passage of said passages; a selector valve disposed in a downstream passage of said passages; a sequence valve of which an operation chamber is connected to a portion between the selector valve and the hydraulic clutch; and a modulator valve having a modulation chamber connected to a portion between the pressure source and the selector valve. The sequence valve is provided with a spool operable to move in accordance with a pressure in the operation chamber and to alternatively connect a booster chamber in the modulator valve to the inching valve and an upstream portion to the inching valve, so that a hydraulic pressure is always supplied into the booster chamber while the selector valve introduces the pressure into the clutch and the inching valve is operated.

4 Claims, 7 Drawing Figures

CONTROL MECHANISM OF A POWER SHIFT TRANSMISSION

BACKGROUND OF THE INVENTION

The present invention relates to a control mechanism of a power shift transmission used in forklifts and others.

Generally, a control mechanism of a power shift transmission is interlocked with a shift lever and a brake pedal and is operable to control engaging and releasing operation of hydraulic clutches. However, known control mechanisms have such a disadvantage that an operator can not perform intended precise stopping and starting operation, because increasing and decreasing characteristics of a clutch hydraulic pressure, which are respectively achieved in stepping on and returning operation of the pedal, are different from each other, as will be described more in detail later. Further, the known mechanisms have such a disadvantage that the operator can not smoothly start a vehicle, because the clutch hydraulic pressure suddenly increases when the brake pedal is returned.

Accordingly it is an object of the invention to provide an improved control mechanism, overcoming the above-noted disadvantages.

Other and further objects, features and advantages of the invention will appear more fully from the following description of the preferred embodiments of the invention.

DETAILED DESCRIPTION OF THE PREFERRED EMBODIMENTS

Figure 1:
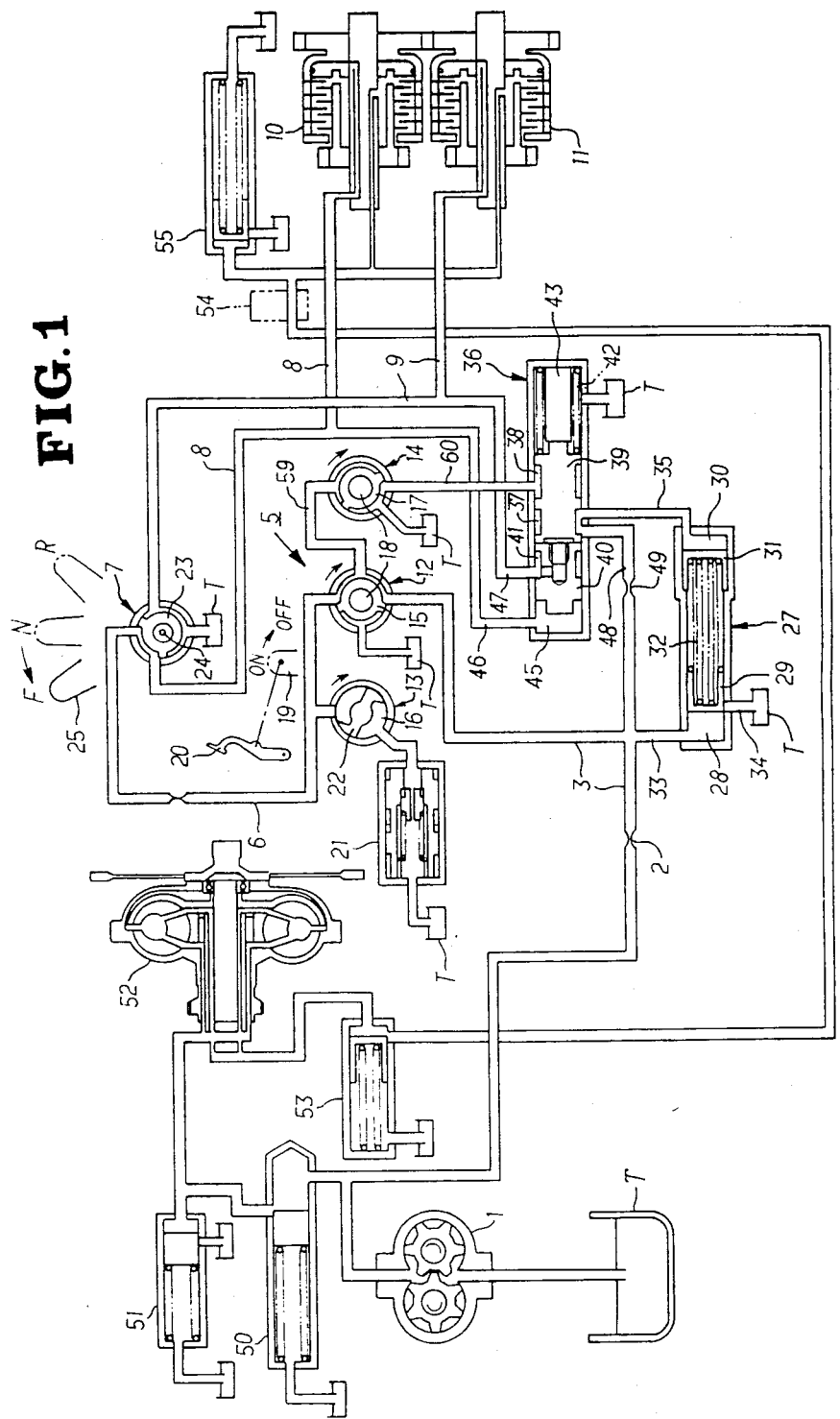
FIG. 1 is a schematic sectional view of a control mechanism according to the invention.

Referring to FIG. 1, a power shift transmission is provided with a single forward clutch 10 and a single reverse clutch 11. An oil pump 1 connected to an oil tank T is connected to an inching valve 5 through an oil passage 3 in which a restrictor 2 is arranged. The valve 5 is connected through a passage 6 to a forward and reverse selector valve 7, which is connected to the forward clutch 10 and the reverse clutch 11 through oil passages 8 and 9 respectively.

The inching valve 5 is provided with coaxial first, second and third valves 12, 13 and 14, in which a common shaft 18 fixed to rotors 15, 16 and 17 is interlocked to a brake pedal 20 through a link 19. In an illustrated onposition, in which the brake pedal 20 is not stepped on, the valve 12 connects the passage 3 and 6 together allowing the hydraulic pressure to be supplied into the valve 7. When the pedal 20 is fully stepped on and lowered, which is an off-position, the valve 12 connects the passage 6 to the tank T and closes the passage 3. The rotor 16 of the second valve 13 is provided with a port 22, through which the passage 6 is connected to a relief valve 21 when the pedal 20 is stepped on and the rotor 16 rotates. Degrees in opening of the port 22 depends on stepped distance of the pedal 20. The third valve 14 connects to the first valve 12 through a passage 59 and also connects through a passage 60 to a sequence valve 36, detailed later.

A rotor 23 of the valve 7 is fixed to a shaft 24 which is interlocked to a shift lever 25. In an illustrated position, in which the lever 25 is in a forward position F, the passage 6 is connected to the passage 8 of the forward clutch 10. When the lever 25 is shifted to a reverse position R, the passage 6 is connected to the passage 9 of the reverse clutch 11. When the lever 25 is shifted to a neutral position N, the passage 6 is closed and the passages 8 and 9 are connected to the tank T so that the pressure in the clutches 10 and 11 is released.

A modulator valve 27 is provided with a modulation piston 29 and a booster piston 31 which are connected together through a compressible coil spring 32. The piston 29 forms a modulation chamber 28 which is connected to the passage 3 through a passage 33 and is also connected to the tank T through a drain passage 34 which can be closed by the piston 29. The piston 31 forms a booster chamber 30 which is connected to the sequence valve 36 through a passage 35. The sequence valve 36, which is an one-way valve, is provided with a first spool 39 and a second spool 40. Two annular grooves 37 and 38 are formed at the outer periphery of the spool 39. An aperture 41 is formed in the spool 40. A compressible coil spring 42 is arranged between the spool 39 and a right end wall in FIG. 1 of the valve 36. The above right end wall is provided with a stopper 43 projecting toward the spool 39. An operation chamber 45 is formed between the spool 40 and a left end wall in FIG. 1 of the valve 36 and is connected to the passage 8 through a passage 46. The aperture 41 is connected to the passage 9 through a passage 47. Further, the sequence valve 36 is connected to the passage 3 through a passage 48. The passage 48 is connected to the passage 35 through the groove 37 in the illustrated condition, in which a hydraulic pressure is supplied into the forward clutch 10, whereby, the pressure is also introduced into the operation chamber 45 and the spool 39 and 40 is shifted to the right end position in FIG. 1. A restrictor 49 is arranged in the passage 48. The groove 38 is connected to a passage 60. The passage 3 is also connected through a main pressure regulator valve 50 to an inlet relief valve 51 of a torque converter 52. Th converter 52 is also provided with an outlet pressure regulator valve 53, which is connected through an oil cooler 54 to a pressure regulator valve 55 for a lubrication oil.

Figure 2:
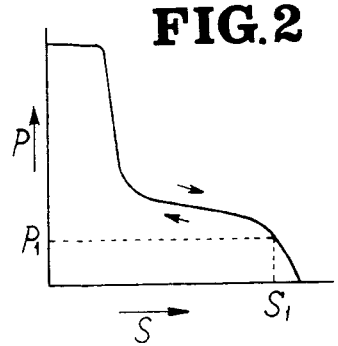
FIG. 2 is a graph explaining hydraulic pressure characteristics according the control mechanism of the invention.
Figure 3:
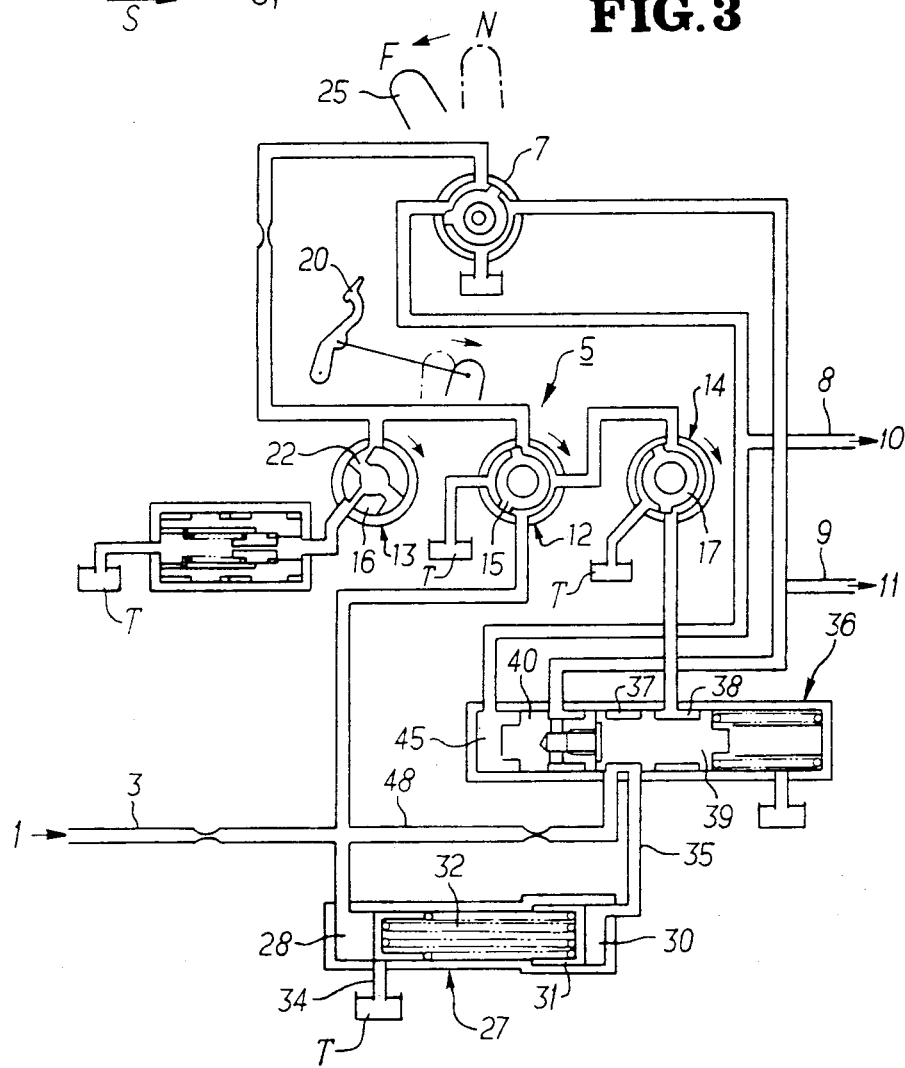
FIG. 3 is a schematic sectional view of the mechanism in other operating stage.
Figure 4:
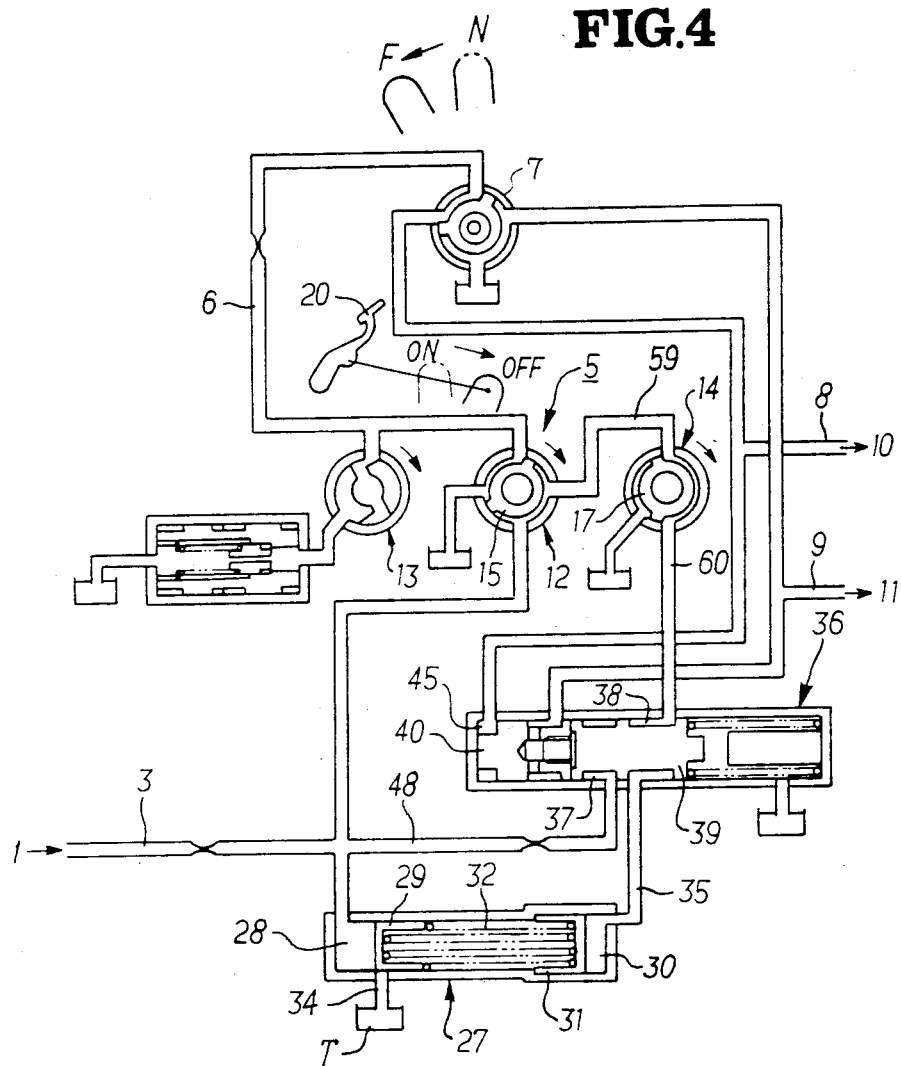
FIG. 4 is a schematic sectional view of the mechanism in another operating stage.

The functions or operations are as follows. In the illustrated condition in FIG. 1, the brake pedal 20 is not stepped on and the shift lever 25 is in the forward position F, so that the hydraulic pressure is introduced into the forward clutch 10 and the clutch 10 is engaged. When the brake pedal 20 is stepped on as illustrated in FIG. 3, the rotor 16 as well as the rotors 15 and 17 of tthe inching valve 5 rotates and the port 22 gradually opens, so that as shown in FIG. 2, the clutch hydraulic pressure P decreases in accordance with increase of a stroke S of the brake pedal 20. In this step-on operation, the pressure in the operation chamber 45 of the sequence valve 39 decreases in accordance with the clutch pressure P, so that the spools 39 and 40 move leftward in FIG. 3. However, before the pressure P decreases to a switching value of P1, e.g., 1.6 kg/cm², which is slightly larger than a lowermost value, the passage 35 connects to the passage 48 through the groove 37, so that the pressure is supplied into the booster chamber 30 through the passages 48 and 35. When the brake pedal 20 is fully stepped on as illustrated in FIG. 4 and the pedal stroke S increases over a predetermined value S1, the clutch pressure P decreases below the switching value P1. In this condition, the passage 35 connects to the passage 60 through the groove 38, whereby the pressure is supplied into the chamber 30 through the third valve 14.

As described hereinbefore, the pressure is always supplied into the chamber 30 throughout the above step-on operation, and the booster piston 31 is shifted leftward and compresses the spring 32, so that such a condition is kept that the modulation piston 29 is hard to move rightward and the drain passage 34 is also hard to open, in other words, a setting pressure is kept high in the modulator valve 27. Therefore, a little oil is discharged through the drain passage 34, and the modulator valve 27 does not participate in the pressure decreasing performance in the step-on operation of the pedal 20.

When the brake pedal 20 is slowly returned, the inching valve 5 gradually increases the clutch pressure P. In this return operation of the pedal 20, the setting pressure of the modulator valve 27 is always kept high similarly to said step-on operation, and the valve 27 does not participate in the pressure increasing performance in the return operation. Therefore, an increasing characteristic of the clutch pressure P coincides with a decreasing characteristic of the clutch pressure in the pedal step-on operation.

Figure 5:
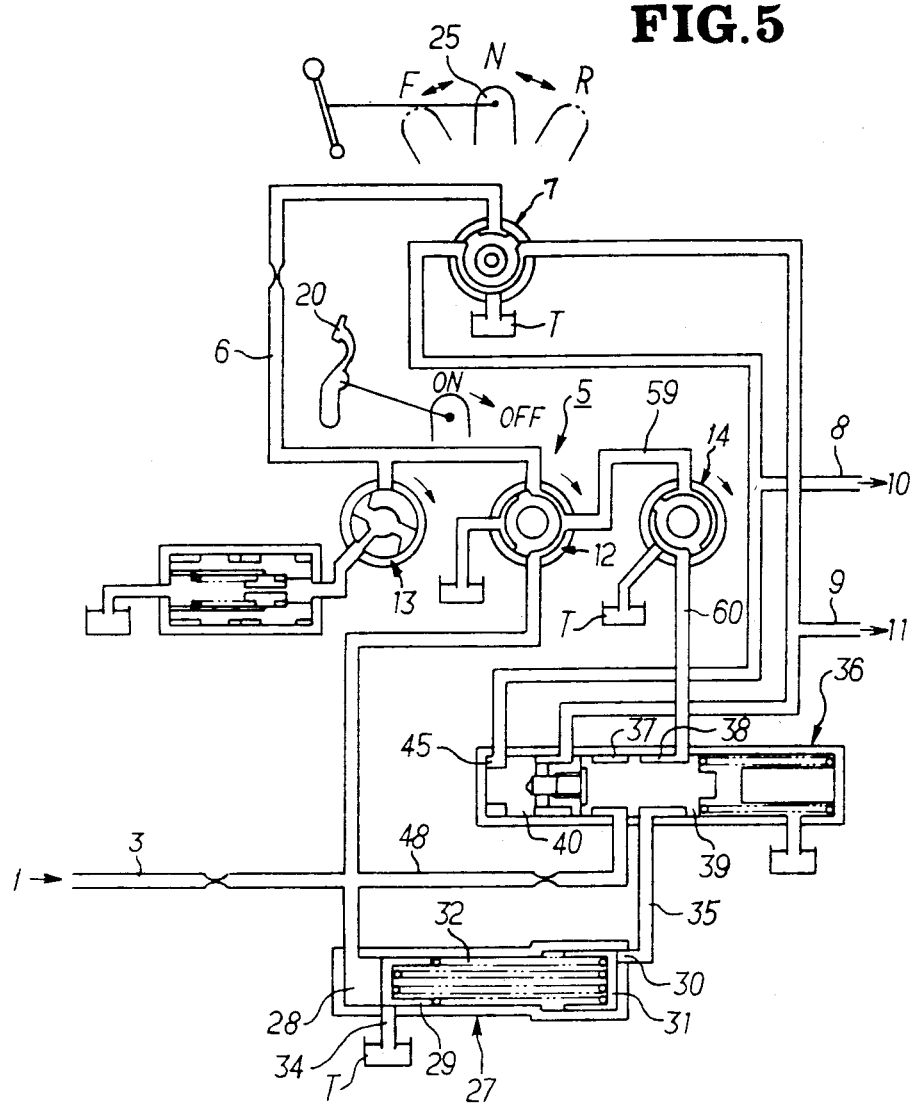
FIG. 5 is a schematic sectional view of the mechanism in still another stage.

The modulator valve 27 functions as follows. Referring to FIG. 5, when the brake pedal 20 is not stepped on and the shift lever 25 is in the neutral position N, both clutch passages 8 and 9 are connected to the tank T through the selector valve 7, and the pressure is reduced in both clutches 10 and 11 and the chamber 45 so that the spools 39 and 40 are shifted leftward. Thus, the chamber 30 is connected to the tank T through the passage 35, the groove 38, the passage 60 and the third valve 14, and the pressure is reduced in the chamber 30, which allows the piston 31 to move rightward and the spring 32 to extend. Therefore, the elasticity of the spring 32 is reduced, and such a condition is kept that a light pressure can shift the piston 29 rightward and can open the drain passage 34. Namely, the setting pressure is kept low.

When the shift lever 25 is shifted into the forward driving position F or the reverse driving position R without stepping on the brake pedal 20, the passage 8 or 9 fully connects with the passages 6 and 3. However, the modulator valve 27 keeps the low setting pressure with discharging much oil through the passage 34. Therefore, the pressure supplied to the clutch 10 or 11 through the passages 6 and 8 or 9 does not increases to a large value, thus the clutch 10 or 11 does not engages suddenly. Namely, a hydraulic shock is prevented or reduced in the shifting operation. After the pressure in the passage 8 or 9 increases over the switching value P1, the spool 39 as well as the spool 40 is shifted to a right area in FIG. 5 in which the groove 37 connects the passages 35 and 48 together, so that a high pressure is supplied into the chamber 30 and the spring 32 is compressed. Consequently, the setting pressure increases and the quantity of the drain oil through the passage 34 is reduced. Thus the clutch pressure P rapidly increases thereafter, and the clutch 10 or 11 rapidly engages.

According to the invention, as stated hereinbefore, the changing characteristic of the clutch pressure P in the step-on operation of the brake pedal 20 coincides with that in the returning operation of the pedal 20. Therefore, an operator can return the pedal 20 to engage the clutches 10 and 11 with same feeling as that in the pedal step-on operation. Further, such a disadvantage can be prevented that the clutch pressure P suddenly increases and the clutches 10 and 11 suddenly engages. in the returning operation of the pedal 20.

For the reference, a known conventional mechanism has such constructions and functions that is detailed hereinafter with reference to FIG. 6.

Figure 6:
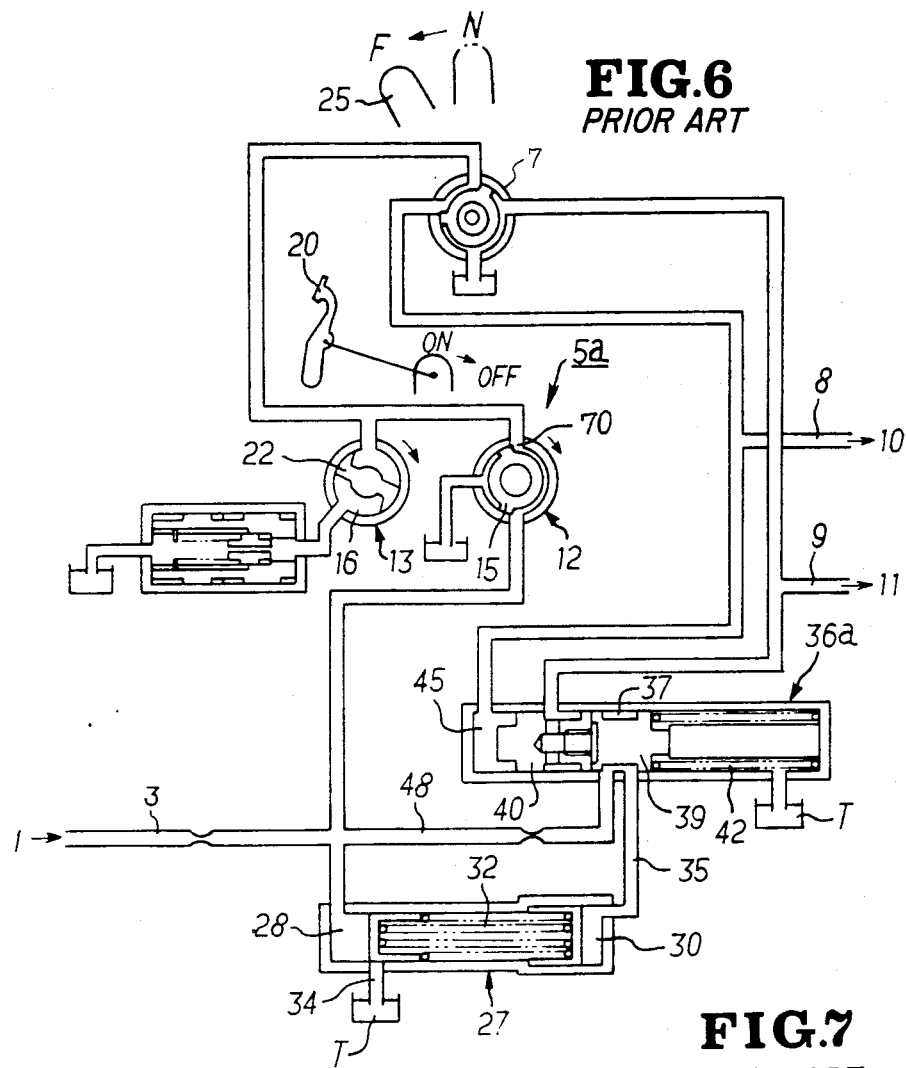
FIG. 6 is a schematic sectional view of a known mechanism.

Referring to FIG. 6, the structures shown are similar in some mechanisms to those in FIG. 1, and thus the same members bear the same reference numbers. According to the known mechanism in FIG. 6, an inching valve 5a is not provided with the third valve 14 in FIG. 1, and is not connected to a sequence valve 36a. A first spool 39 is provided with only one annular groove 37.

Figure 7:
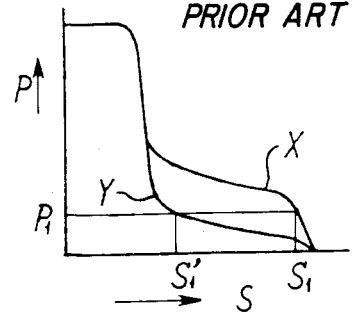
FIG. 7 is a graph explaining a clutch hydraulic pressure characteristics according to the known mechanism.

In a condition illustrated in FIG. 6, a shift lever 25 is in a forward driving position F, and a brake pedal 20 is not stepped. While the pedal 20 is being stepped on, the inching valve 5a graudually decreases a clutch hydraulic pressure P as indicated in a curve X in FIG. 7. In this operation, a pressure in an operation chamber 45 also decreases in accordance with the clutch pressure P, and spools 39 and 40 move leftward. However, a passage 35 is connected to a passage 48 through the groove 37 before the pressure P decreases to a switching value P1 near a lowermost value, so that a high pressure is supplied into a booster chamber 30, and a modulator valve 27 keeps a high setting pressure with discharging a little drain oil. When the pedal stroke S increases to a value S1 near the maximum value and the clutch pressure decreases to the switching value P1, the passage 35 connects to the tank T through a space in which a spring 42 is arranged, so that the pressure in the chamber 30 is reduced and the setting pressure in the modulator valve 27 is also reduced.

When the brake pedal 20 is returned, the clutch pressure P gradually increases. However, since the modulator valve 27 keeps the low setting pressure with discharging much oil through the drain passage 34, increasing rate of the clutch pressure as well as the pressure in the chamber 45 is low. Therefore, even after the pedal stroke S decreases below the switching value S1, the spool 39 does not return to a position in which the passage 35 is connected to the passage 48, so that the pressure in the chamber 30 is kept in reduced condition, thus, the valve 27 still keeps the low setting value with discharging much oil, and the clutch pressure P slowly increases as shown in a curve Y in FIG. 7.

When the pedal stroke S decreases to a switching value S'1 and the clutch pressure P increases to the switching value P1, the spool 39 and 40 reaches a position in which the passages 35 and 48 are connected together through the annular groove 37, so that the pressure in the chamber 30 increases and the spring 32 is compressed, thus the setting pressure increases and the relief oil quantity is remarkably reduced. On the other hand, a supply port 70 of a first valve 12 connecting to a selector valve 7 is rather largely open at the stroke of the switching value S'1. This condition and the above-noted remarkable reduction of the relief oil causes a sudden increase of the pressure P thereafter.

According to the known mechanism, as stated hereinbefore, the changing characteristic of the clutch pressure P in the step-on operation of the pedal 20 is different from that in the return operation of the pedal 20. Therefore, an operation feeling of the clutches 10 and 11 in the starting operation is different from that in the stopping operation, thus the operator can not perform precise starting and stopping operation. Further, since the pressure P suddenly increases at the stroke value S'1 during the returning operation of the pedal 20, the operator can not perform a smooth starting operation.

Although the invention has been described in its preferred form with a certain degree of particularity, it is understood that the present disclosure of the preferred form may be changed in the details of construction and the combination, and arrangement of parts may be resorted to without departing from the spirit and scope of the invention as hereinafter claimed.

What is claimed is:

1. A control mechanism of a power shift transmission arranged in oil passages between a hydraulic pressure source and a hydraulic clutch, comprising an inching valve disposed in an upstream passage of said passages; a selector valve disposed in a downstream passage of said passages; a sequence valve of which an operation chamber is connected to a third passage between the selector valve and the hydraulic clutch; and a modulator valve having a modulation chamber connected to a fourth passage between the pressure source and the selector valve, a drain passage connectable to the modulation chamber, and a booster chamber connected to the sequence valve; said modulator valve being provided with a piston faced to the modulation chamber and operable to open and close the drain passage, a piston faced to the booster chamber, and a compressible coil spring disposed between both pistons; said sequence valve being provided with a spool operable to move in accordance with a pressure in the operation chamber and to alternatively connect the booster chamber to the inching valve and a passage upstream of the inching valve, so that a hydraulic pressure is always supplied into the booster chamber while the selector valve introduces the pressure into the clutch and the inching valve is operated.

2. A control mechanism of claim 1 wherein said inching valve is connected to a brake pedal, and said selector valve is connected to a shift lever.

3. A control mechanism of claim 2 wherein said inching valve is provided with a valve which is operable to supply a hydraulic pressure from the pressure source into the booster chamber through the sequence valve when the shift lever is in a driving position and the brake pedal is fully stepped on.

4. A control mechanism of any one of claims 1 to 3 wherein a single forward driving clutch and a single reverse driving clutch are connected to the selector valve.

* * * * *